(12) United States Patent
Zanarelli et al.

(10) Patent No.: US 7,931,235 B2
(45) Date of Patent: Apr. 26, 2011

(54) SYSTEM FOR DEICING THE LEADING EDGE OF A NOSE INLET COWL TURBINE ENGINE

(75) Inventors: Marie-Luce Zanarelli, Tournefeuille (FR); Alain Porte, Colomiers (FR)

(73) Assignee: Airbus France, Toulouse (FR)

( * ) Notice: Subject to any disclaimer, the term of this patent is extended or adjusted under 35 U.S.C. 154(b) by 622 days.

(21) Appl. No.: 11/914,739

(22) PCT Filed: Jun. 1, 2006

(86) PCT No.: PCT/FR2006/001241
§ 371 (c)(1),
(2), (4) Date: Nov. 16, 2007

(87) PCT Pub. No.: WO2006/131623
PCT Pub. Date: Dec. 14, 2006

(65) Prior Publication Data
US 2008/0149771 A1    Jun. 26, 2008

(30) Foreign Application Priority Data
Jun. 7, 2005 (FR) ...................................... 05 05757

(51) Int. Cl.
*B64D 15/02* (2006.01)
(52) U.S. Cl. .................................................. 244/134 B
(58) Field of Classification Search ............... 244/134 R, 244/134 B, 134 C, 53 B; 60/39.093
See application file for complete search history.

(56) References Cited

U.S. PATENT DOCUMENTS

| | | | | |
|---|---|---|---|---|
| 4,674,714 A | * | 6/1987 | Cole et al. ................. | 244/134 B |
| 6,193,192 B1 | * | 2/2001 | Porte ......................... | 244/134 B |
| 2003/0217778 A1 | | 11/2003 | Challender | |

FOREIGN PATENT DOCUMENTS

| | | |
|---|---|---|
| EP | 0 178 144 | 4/1986 |
| EP | 0 205 283 | 12/1986 |
| EP | 0 870 965 | 10/1998 |
| EP | 0 918 150 | 5/1999 |
| GB | 908926 | 10/1962 |
| GB | 2 259 679 | 3/1993 |

OTHER PUBLICATIONS

PCT International Search Report dated Nov. 9, 2006.

* cited by examiner

*Primary Examiner* — Timothy D Collins
*Assistant Examiner* — Joseph W Sanderson
(74) *Attorney, Agent, or Firm* — Dickinson Wright PLLC

(57) ABSTRACT

The invention concerns a system for deicing the leading edge of a nose inlet cowl for a turbine engine. The invention is characterized in that one of the two elements formed by the pressurized hot air supply duct (6) and by the protective casing (15) is longitudinally rigid, while the other of said elements comprises at least two mutually nested parts adapted to slide sealingly relative to each other; and said two elements (6, 15) are, on one side, rigidly fixed to one of said partitions (5) of the structure box (10), while, on the other side, said two elements are rigidly linked to each other (in 18) and are adapted to slide jointly relative to a sliding bearing (17) provided in the other partition (16).

8 Claims, 5 Drawing Sheets

SYSTEM FOR DEICING THE LEADING EDGE OF A NOSE INLET COWL TURBINE ENGINE

The present invention relates to the deicing of nose inlet cowls of turbine engines, in particular for aircraft.

It is known that, if required (to prevent the formation of ice or remove ice already formed), the leading edge of the nose inlet cowl of such turbine engines is deiced by heating with pressurized hot air taken from said turbine engine and conducted to said leading edge by a circuit for circulating hot air. This pressurized hot air taken from the engine is at a high temperature, for example around 500° C., such that said duct radiates heat and the surrounding structures of said nose inlet cowl that are sensitive to heat (for example the soundproofing panels made of composite material) must be protected from the heat. Furthermore, for obvious safety reasons, it is also necessary to provide protection for said surrounding structures in the event of pressurized hot air leaks or in the event of said duct being ruptured.

Accordingly, document EP-1 251 257 discloses a nose inlet cowl for a turbine engine, in particular for an aircraft, said nose inlet cowl being provided with means for deicing its leading edge and comprising to this end:
- a hollow leading edge defining an annular chamber closed by a first internal bulkhead;
- a pressurized hot air supply duct designed to be connected, at its rear end opposed to said leading edge, to a pressurized hot air circuit and, at its front end toward said leading edge, to an injector injecting said pressurized hot air into said annular chamber, said supply duct being at least partly arranged in a compartment defined, at the front, by said first internal bulkhead and, at the rear, by a second internal bulkhead; and
- an internal protective envelope arranged in said compartment and defining an isolation volume enclosing said supply duct.

Thus, in this known nose inlet cowl, said duct is isolated from the remaining interior space of the nose inlet cowl, and said internal protective envelope, which is continuous and integral, enables the surrounding structures to be protected from thermal radiation and pressurized hot air leaks and also from the effects of a rupturing of said duct. The provision of air inlet and outlet openings makes it possible, during normal operation, to achieve permanent internal ventilation of the isolation volume, thereby limiting the thermal radiation of the supply duct, the heat-sensitive surrounding structures thus being protected from any damage or aging associated with the exposure to high temperatures. In the event of the duct leaking, rupturing or exploding, the hot air is discharged to the outside through the outlet opening such that, once again, said surrounding structures are protected from the pressurized hot air.

This known nose inlet cowl thus perfectly performs its functions of thermally protecting said surrounding structures. However, in practice, to prevent the longitudinal expansion of said supply duct and of said protective envelope (which are generally made of steel) under the effect of the temperature from imposing stresses on said first and second bulkheads, it is required to produce each of the two elements formed by said supply duct and said protective envelope in two parts which are nested one inside the other and able to slide relative to one another in a sealed manner.

Thus, the increase due to heat in the length of said duct and of said envelope is absorbed by the retractable sliding movement of said two parts forming these elements.

However, it should be noted that the hot air circulating in said supply duct is under a high pressure, for example around 10 to 20 bar, with the result that this internal pressure has the effect of separating the two parts of said supply duct from one another during normal operation and of separating the two parts of said supply duct and the two parts of the protective envelope from one another in the event of said supply duct rupturing. This consequently results in stresses being applied to said bulkheads by the two parts of said supply duct and/or of said protective envelope, said stresses tending to deform said bulkheads by making them bulge toward the outside of the compartment. It thus becomes necessary to provide heavy and costly reinforcements designed to counter such bulging.

The subject of the present invention is a deicing system that makes it possible to avoid the deformations of the bulkheads without thereby using reinforcements for said bulkheads.

To this end, according to the invention, the system for deicing the leading edge of a nose inlet cowl for a turbine engine, in particular for an aircraft, said leading edge being hollow and defining an annular chamber closed by a first internal bulkhead, and said deicing system comprising:
- a pressurized hot air supply duct designed to be connected, at its rear end opposed to said leading edge, to a pressurized hot air circuit and, at its front end toward said leading edge, to an injector injecting said pressurized hot air into said annular chamber of the leading edge, said supply duct passing through a compartment of said nose inlet cowl that is defined, at the front, by said first internal bulkhead and, at the rear, by a second internal bulkhead; and
- an internal protective envelope arranged in said compartment and defining an isolation volume enclosing said supply duct, is noteworthy in that:
- one of the two elements formed by said supply duct no and by said protective envelope is longitudinally rigid, while the other of said elements comprises at least two parts nested one inside the other and able to slide relative to one another in a sealed manner; and
- said two elements are, on one side, rigidly fastened to one of said bulkheads, while, on the other side, said two elements are rigidly connected to one another and are able to slide jointly relative to a sliding bearing provided in the other bulkhead.

Thus, as will be seen in more detail below, that one of said two elements which is longitudinally rigid acts as a tie rod for the other of said elements by limiting the elongation thereof, and the elongation specific to said tie rod has no effect on said bulkheads owing to the presence of said sliding bearing.

Said supply duct may be longitudinally rigid, whereas said protective envelope comprises at least two parts nested one inside the other and able to slide relative to one another in a sealed manner. However, in one preferred embodiment, said protective envelope is longitudinally rigid, whereas said supply duct comprises at least two parts nested one inside the other and able to slide relative to one another in a sealed manner.

Said sliding bearing may be arranged either in said first internal bulkhead or in said second internal bulkhead.

Advantageously, said sliding bearing comprises a stop designed to limit the sliding movement of said supply duct and of said protective envelope relative to the corresponding bulkhead.

The rigid connection between said supply duct and said protective envelope may be produced by means of flanges.

The figures of the appended drawing will give a clear understanding of how the invention can be implemented. In these figures, identical references denote like elements.

FIG. 1 shows, in axial section, the leading edge of a known nose inlet cowl.

FIG. 2 schematically illustrates the known leading edge shown in FIG. 1 and depicts the disadvantage thereof which the present invention overcomes.

FIGS. 3A, 3B and 3C schematically illustrate, in the manner of FIG. 2, three different positions of the system for deicing the leading edge in accordance with the present invention, according to a first preferred embodiment.

Figure 3:
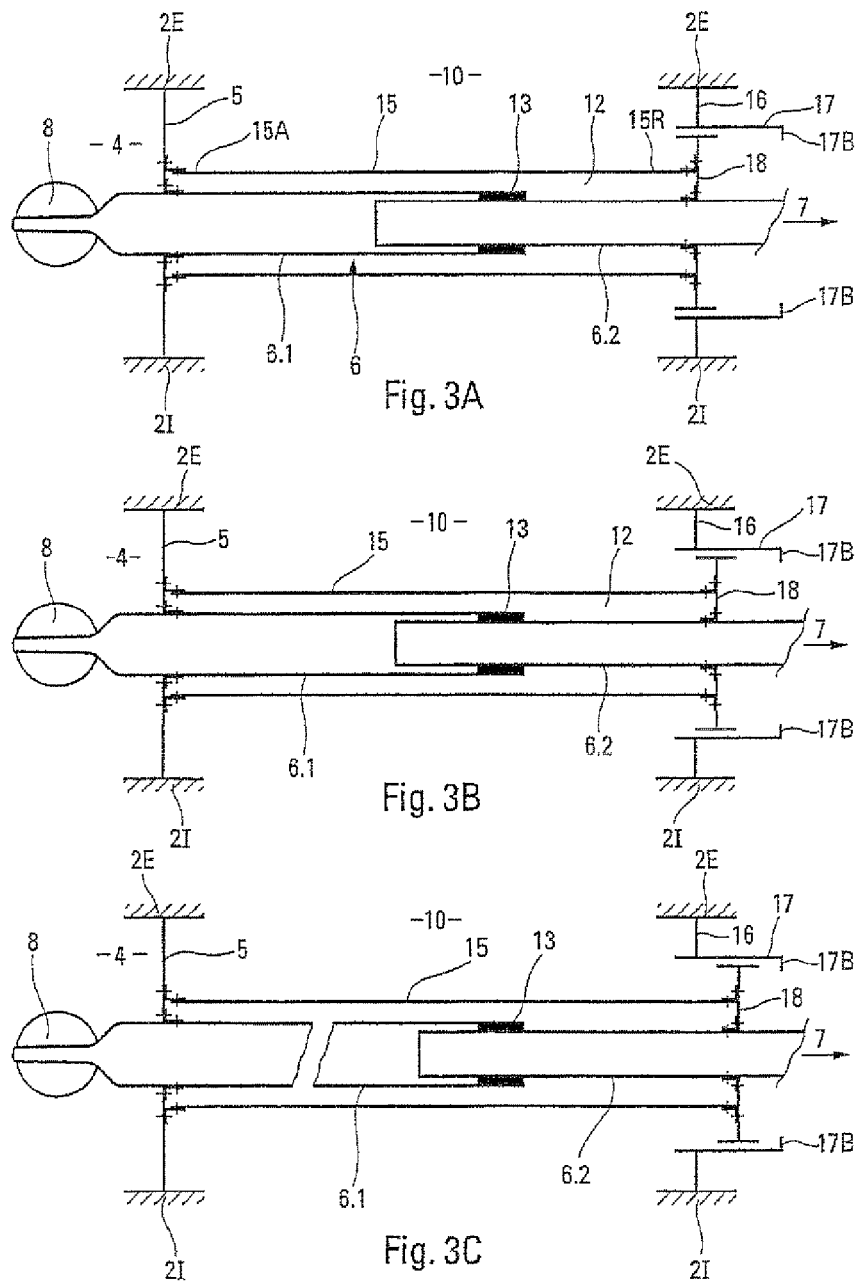
Figure 6A:
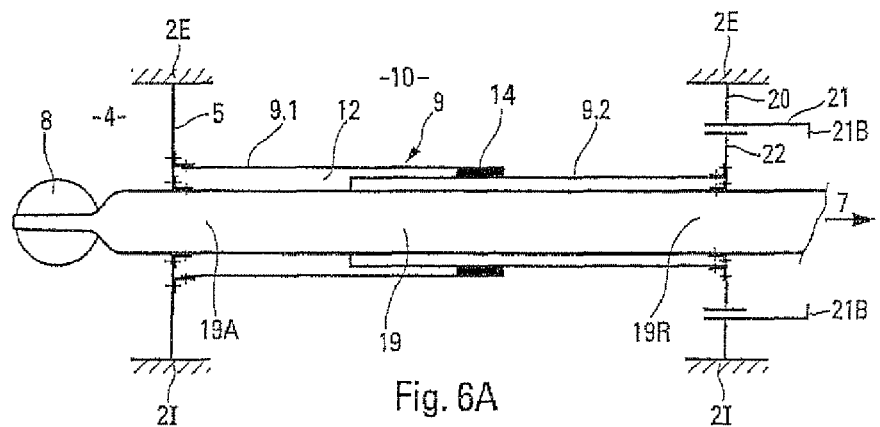
Figure 6B:
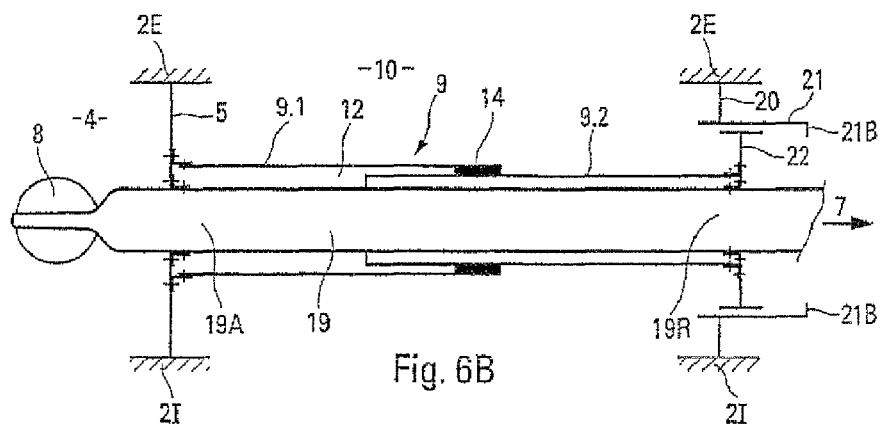
Figure 6C:
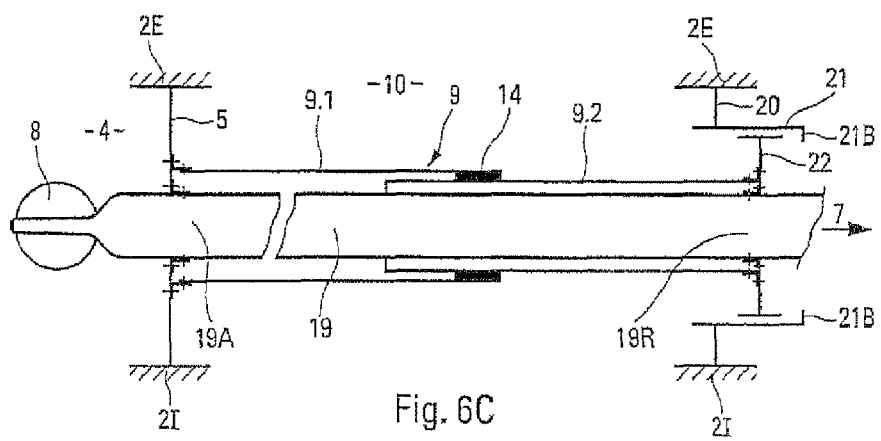

FIGS. 6A, 6B and 6C schematically illustrate, in a comparable manner to FIGS. 3A, 32 and 3C, the same three different positions for a second embodiment of the present invention.

Figure 7:
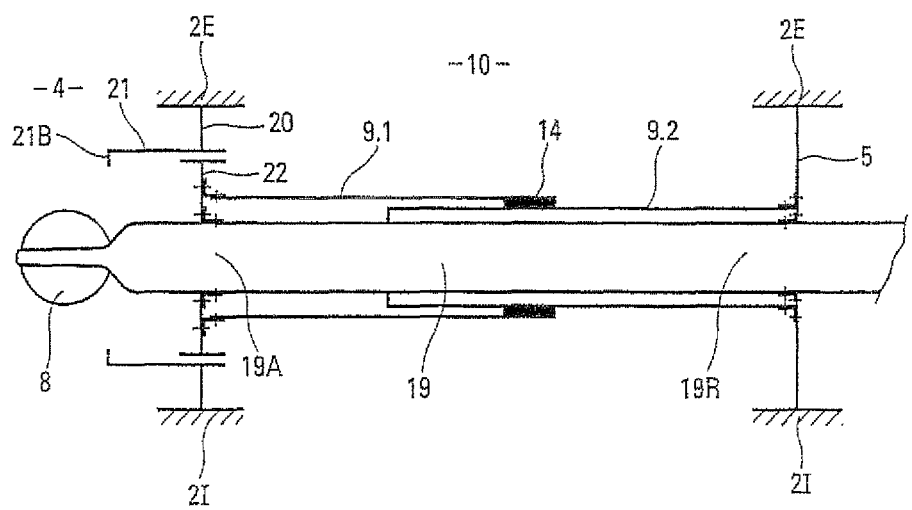

FIG. 7 illustrates a variant of the second embodiment shown in FIGS. 6A, 62, 6C.

The leading edge 1 of the cowl 2 surrounding the air inlet 3 of an aircraft turbine engine (not otherwise represented) is provided with known deicing means which comprise:

an internal peripheral chamber 4 formed in the hollow leading edge 1 and closed by an internal front bulkhead 5 of annular shape which is anchored to the upper surface side 2E and to the lower surface side 2I of the cowl 2;

a pressurized hot air supply duct 6 designed to be connected, at its rear end 6R opposed to said leading edge 1, to a circuit 7 of pressurized hot air originating from the hot-stream generator of the turbine engine (not shown) and, at its front end GA, to an injector 8 injecting said pressurized hot air into said internal chamber 4 of the leading edge 1; and a tubular protective envelope 9 surrounding said supply duct 6.

The supply duct 6 and the protective envelope 9 pass through a compartment 10 defined, at the front, by said internal front bulkhead 5 and, at the rear, by an internal rear bulkhead 11 of annular shape which is anchored to the upper surface side 2E and to the lower surface side 2I and through which said rear end 6R of the duct 6 passes. Thus, said protective envelope 9 defines, in collaboration with the front 5 and rear 11 bulkheads, an isolation volume 12.

Figure 1:
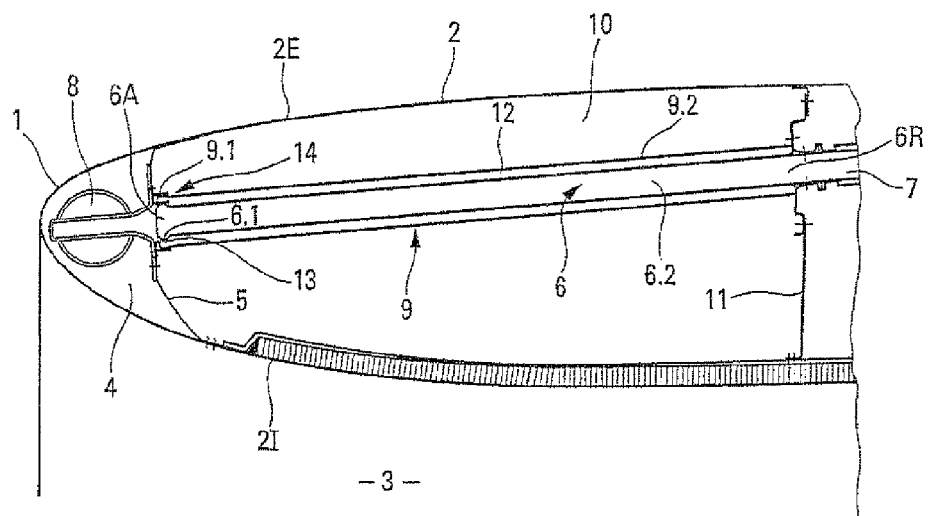
Figure 2:
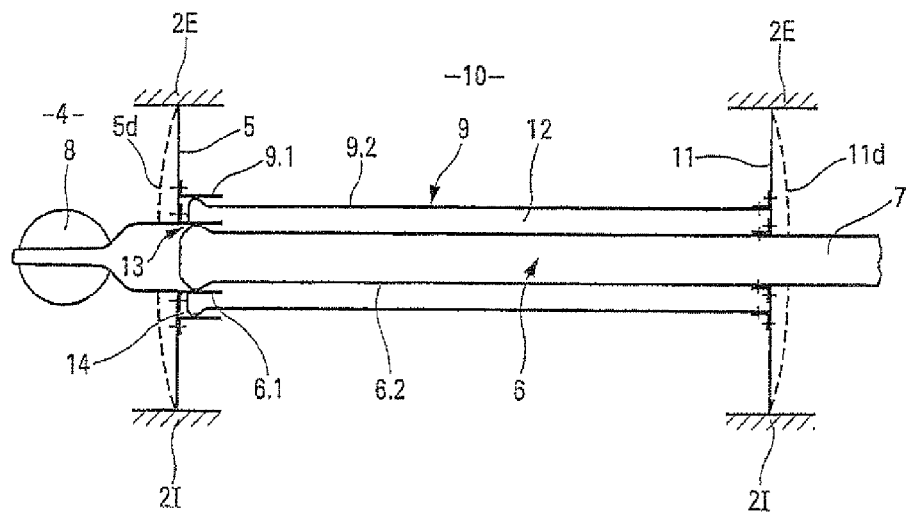

In this known embodiment shown in FIGS. 1 and 2, both the supply duct 6 and the protective envelope 9 are in fact formed by two parts, respectively 6.1, 6.2 and 9.1, 9.2. The two parts 6.1, 6.2 of said supply duct 6 are mounted telescopically relative to one another and are connected in a sealed manner by a sliding seal or a bellows 13. Likewise, the two parts 9.1 and 9.2 of the protective envelope 9 are mounted telescopically and are connected in a sealed manner by a sliding seal or a bellows 14.

Moreover, the parts 6.1 and 9.1 are rigidly fastened to the front bulkhead 5, whereas the parts 6.2 and 9.2 are rigidly fastened to the rear bulkhead 11.

It will readily be appreciated that the production of the supply duct 6 and of the protective envelope 9 in the form of two telescopic parts 6.1, 6.2 and 9.1, 9.2 makes it possible to eliminate the pressure exerted on said bulkheads 5 and 11 by the thermal expansion of the supply duct 6 and of the protective envelope 9 under the effect of the hot air passing through the supply duct 6.

However, since the hot air passing through said supply duct 6 is under high pressure, this pressure exerts a separating action on the two parts 6.1 and 6.2 of the supply duct 6 and, therefore, on the two parts 9.1 and 9.2 of the protective envelope 9.

As a result, the supply duct 6 acts in the manner of a ram on the partitions 5 and 11, which bulge toward the outside of the compartment 10, as is schematically represented by the broken lines 5d and lid in FIG. 2. It goes without saying that, in the event of the supply duct 6 rupturing accidentally, the hot air expands into the isolation volume 12, such that the separating action exerted by said hot air on the bulkheads 5 and 11 is increased further still by the larger-diameter ram thus formed by the protective envelope 9. It is therefore necessary to provide reinforcements (for example connecting rods, not shown) applied to said bulkheads 5 and 11 so as to prevent them from bulging not only during operation but also in the event of the supply duct 6 rupturing, this increasing the cost and the mass of the aircraft.

FIGS. 3A, 39 and 3C schematically represent a deicing system according to the invention by means of which these disadvantages can be overcome. By contrast with the known embodiment shown in FIGS. 1 and 2, in the deicing system shown in FIGS. 3A, 3B and 3C:

the front bulkhead 5 and the supply duct 6 (in the form of two telescopic parts 6.1 and 6.2 connected in a sealed manner) remain unchanged;

the protective envelope 9 (in the form of two parts 9.1 and 9.2) is replaced by a one-piece protective envelope 15; and the rear bulkhead 11 is replaced by a bulkhead 16 provided with a sliding bearing 17.

Furthermore, in this embodiment shown in FIGS. 3A, 3B and 3C:

the part 6.1 of the supply duct 6 and the front part 15A of the protective envelope 15 are rigidly fastened to the front bulkhead 5; and the part 6.2 of the supply duct 6 and the rear part 15R of the protective envelope 15 are secured to one another by way of securing means 18 and are able to slide jointly in the sliding bearing 17.

FIG. 3A represents, for example, the state of the deicing system according to the invention at rest, without pressurized hot air flowing in the supply duct 6 toward the injector 8. If, starting from the state shown in FIG. 3A, pressurized hot air is admitted into said supply duct 6, said duct 6 has a tendency to elongate under the combined action of the temperature (longitudinal expansion) and of the internal pressure (separation of the parts 6.1 and 6.2 from one another). However, given that, in a first instance, the protective envelope 15 remains cold, and therefore of fixed length, the supply duct 6 is prevented from elongating by said protective envelope 15, which acts like a tie rod. The deicing system therefore remains in the state shown in FIG. 3A.

Subsequently, with the temperature of the protective envelope 15 increasing under the effect of the thermal radiation of the supply duct 6, this protective envelope 15 expands longitudinally such that the securing means 18 are displaced with respect to the sliding bearing 17, as represented in FIG. 3B. However, once again, the elongation of the duct 6 under the combined effect of the temperature and the pressure is limited by the tie rod (whose length is thus greater than that represented in FIG. 3A) formed by the protective envelope 15.

If now, as represented in FIG. 3C, the supply duct 6 ruptures, the pressurized hot air expands into the protective envelope 15, which is then subjected to the temperature and to the pressure of said hot air. Consequently, the protective envelope 15 thus elongates under the combined action of the temperature and of the pressure, and the securing means 18 are displaced relative to the bearing 17, the longitudinal expansion of the ruptured supply duct 6 (see FIG. 3C) still being contained by said protective envelope 15.

It will therefore be noted from the foregoing that, in each case, the longitudinal expansion of the duct 6 is controlled and contained by the protective envelope 15, without forces being applied to the bulkheads 5 and 16, by virtue of the securing means 18 sliding in the sliding bearing 17.

Where appropriate, the sliding bearing 17 may, as a safety measure, comprise a stop 172 limiting the sliding travel toward the outside of the compartment 10.

Figure 4:
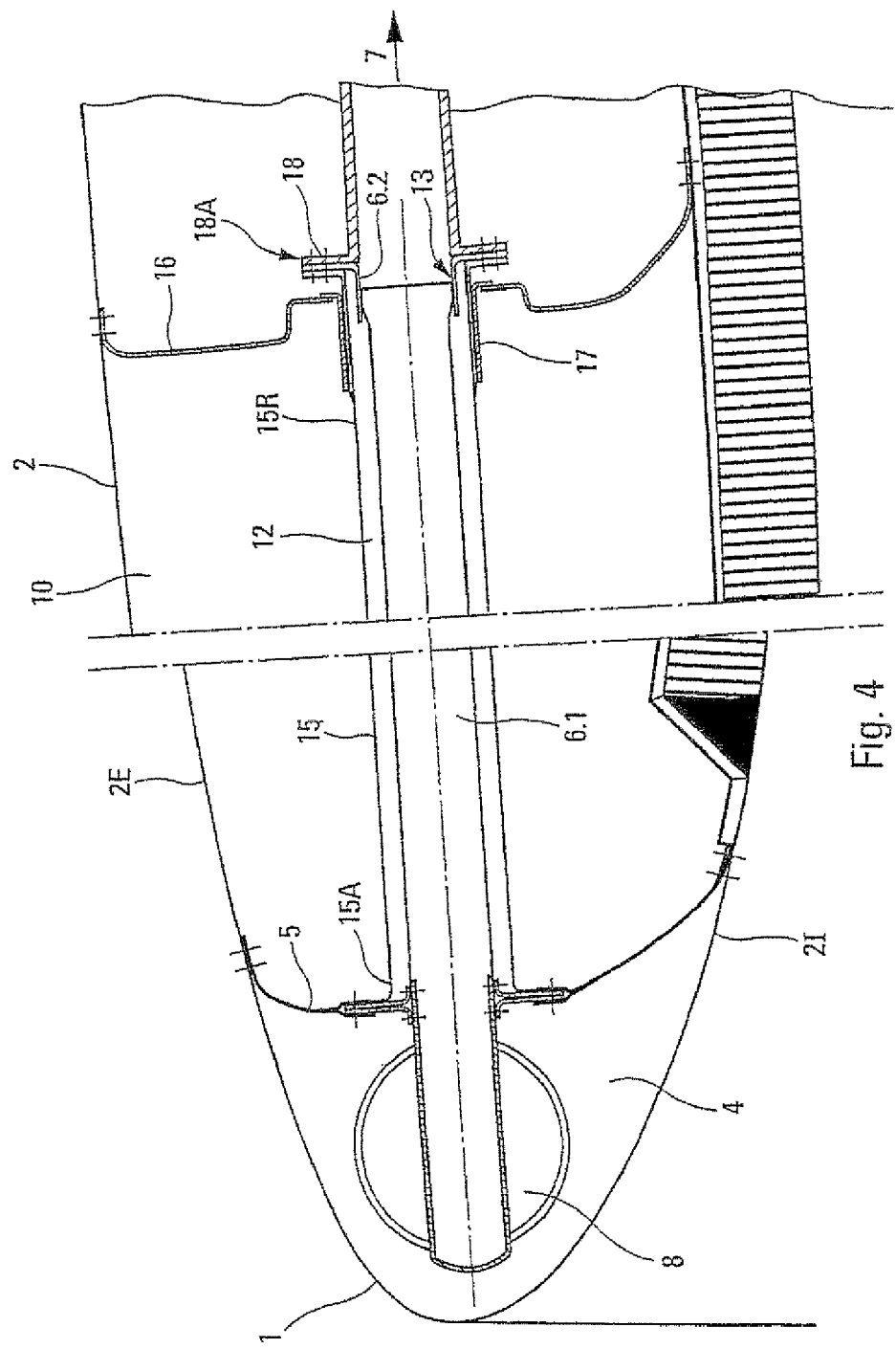
FIG. 4 shows, in a partial schematic view, a practical exemplary embodiment of the first embodiment shown in FIGS. 3A, 3B and 3C.

FIG. 4 shows a practical exemplary embodiment of the deicing system represented schematically in FIGS. 3A, 33 and 3C. It can be seen that the protective envelope 15 is directly slidably mounted in the bearing 17 and that the securing means 18 are of the type comprising flanges 18A.

Figure 5:
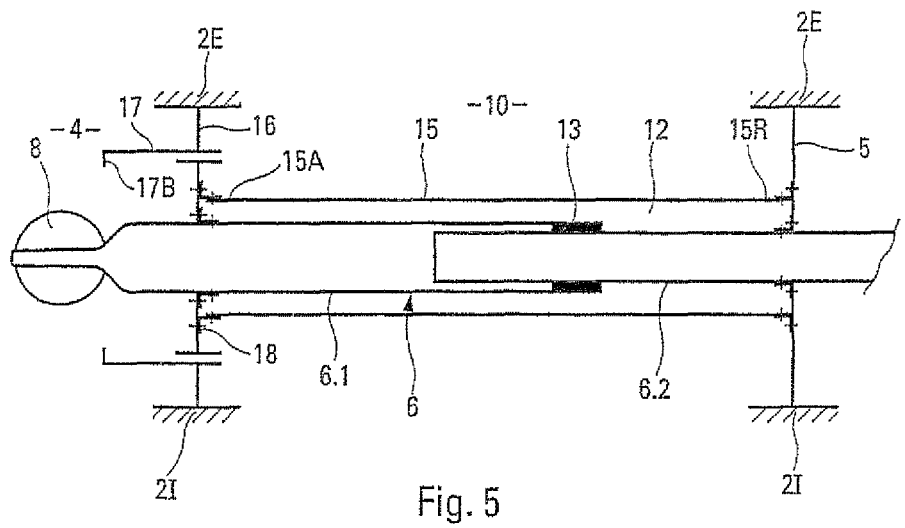
FIG. 5 illustrates a variant of said first embodiment.

Although, in FIGS. 3A, 3B, 3C and 4, the front bulkhead has been represented as being fixed and the rear bulkhead as being provided with the bearing 17 designed to allow the longitudinal displacement of the securing means 18, it will be readily appreciated from the foregoing and from FIG. 5 that the front and rear bulkheads can be interchanged. In that case, the securing means 18 secure the part 6.1 of the supply duct 6 and the front part 15A of the protective envelope 15, and the stop 173 limits the sliding movement toward the outside of the compartment 10, in the direction of the injector 8.

Another embodiment of the deicing system according to the invention is shown by FIGS. 6A, 6B, 6C. By contrast with the known deicing system shown in FIGS. 1 and 2, in this variant embodiment:
the front bulkhead 5 and the protective envelope 9 (in the form of two telescopic parts 9.1 and 9.2 connected in a sealed manner) remain unchanged;
the supply duct 6 (in the form of two parts 6.1 and 6.2) is replaced by a one-piece supply duct 19; and
the rear bulkhead 11 is replaced by a bulkhead 20 provided with a sliding bearing 21 having a stop 21B toward the outside (the bulkhead 20 and the bearing 21 being respectively similar to the bulkhead 16 and to the bearing 17 shown in FIGS. 3A, 3B and 3C).

Furthermore, in the variant embodiment shown in FIGS. 6A, 6B and 6C:
the part 9.1 of the protective envelope 9 and the front part 19A of the supply duct 19 are rigidly fastened to the front bulkhead 5;
the part 9.2 of the protective envelope 9 and the rear part 19P of the duct 19 are secured to one another by way of securing means 22 and are able to slide jointly in the sliding bearing 21.

FIGS. 6A, 6B and 6C respectively correspond to FIGS. 3A, 3B and 3C.

FIG. 6A represents the deicing system at rest. If pressurized hot air is admitted into the supply duct 19, the latter expands longitudinally, which is permitted by the bearing 21, without applying stresses to the bulkheads 5 and 20 (see FIG. 6D). Furthermore, the telescopic protective envelope 9 follows this elongation. During operation, the elongation of the protective envelope 9 is controlled by the supply duct 19 functioning as a tie rod. If said duct ruptures (FIG. 6C), the protective envelope 9 elongates, but its elongation is limited toward the outside of the compartment 10 by the stop 21B of the barrier 21.

FIG. 7 illustrates a variant of the embodiment shown in FIGS. 6A, 6C and 6D, in which the front and rear bulkheads have been interchanged.

The invention claimed is:

1. A system for deicing the leading edge of a nose inlet cowl for a turbine engine of an aircraft, said leading edge being hollow and defining an annular chamber closed by a first internal bulkhead, and said deicing system comprising:
a pressurized hot air supply duct designed to be connected, at its rear end opposed to said leading edge, to a pressurized hot air circuit and, at its front end toward said leading edge, to an injector injecting said pressurized hot air into said annular chamber of the leading edge, said supply duct passing through a compartment of said nose inlet cowl that is defined, at the front, by said first internal bulkhead and, at the rear, by a second internal bulkhead;
an internal protective envelope arranged in said compartment and defining an isolation volume enclosing said supply duct; and
two elements, a first of said two elements formed by said supply duct and by said protective envelope is longitudinally rigid, and a second of said two elements comprises at least two parts nested one inside the other and configured to slide relative to one another in a sealed manner,
wherein said two elements are, on one side, rigidly fastened to one of said first and second internal bulkheads, and, on the other side, said two elements are rigidly connected to one another and are designed to slide jointly relative to a sliding bearing provided in the other of said first and second internal bulkhead, said sliding bearing comprising a stop designed to limit the sliding movement of said supply duct and of said protective envelope toward the outside of said compartment.

2. The deicing system as claimed in claim 1, wherein said supply duct is longitudinally rigid, and said protective envelope comprises at least two parts nested one inside the other and configured to slide relative to one another in a sealed manner.

3. The deicing system as claimed in claim 1, wherein said protective envelope is longitudinally rigid, and said supply duct comprises at least two parts nested one inside the other and configured to slide relative to one another in a sealed manner.

4. The deicing system as claimed in claim 1, wherein said sliding bearing is arranged in said first internal bulkhead.

5. The deicing system as claimed in claim 1, wherein said sliding bearing is arranged in said second internal bulkhead.

6. The deicing system as claimed in claim 1, wherein said sliding bearing cooperates with said protective envelope.

7. The deicing system as claimed in claim 1, wherein the rigid connection between said supply duct and said protective envelope is produced by means of flanges.

8. A system for deicing the leading edge of a nose inlet cowl for a turbine engine of an aircraft, said leading edge being hollow and defining an annular chamber closed by a first internal bulkhead, and said deicing system comprising:
a pressurized hot air supply duct designed to be connected, at its rear end opposed to said leading edge, to a pressurized hot air circuit and, at its front end toward said leading edge, to an injector injecting said pressurized hot air into said annular chamber of the leading edge, said supply duct passing through a compartment of said nose inlet cowl that is defined, at the front, by said first internal bulkhead and, at the rear, by a second internal bulkhead; and
an internal protective envelope arranged in said compartment and defining an isolation volume enclosing said supply duct; and two elements, a first of said two elements formed by said supply duct and by said protective envelope is longitudinally rigid, and a second of said two elements comprises at least two parts nested one inside the other and configured to slide relative to one another in a sealed manner, wherein said two elements are, on one side, rigidly fastened to one of said first and second internal bulkheads, and, on the other side, said two elements are rigidly connected to one another and are designed to slide jointly relative to a sliding bearing provided in the other of said first and second internal bulkhead, and said sliding bearing is arranged in said second internal bulkhead, and comprises a stop designed to limit the sliding movement of said supply duct and of said protective envelope toward the outside of said compartment.

* * * * *